United States Patent [19]

Wallace et al.

[11] 4,394,689

[45] Jul. 19, 1983

[54] PROGRAMMABLE CRT BRIGHTNESS CONTROL

[75] Inventors: Edward L. Wallace, Ellicott City; Theodore Wright, Crownsville, both of Md.

[73] Assignee: The United States of America as represented by the Secretary of the Navy, Washington, D.C.

[21] Appl. No.: 282,357

[22] Filed: Jul. 13, 1981

[51] Int. Cl.³ .......................................... H04N 5/14
[52] U.S. Cl. .................................... 358/168; 358/185
[58] Field of Search ................ 358/168, 93, 181, 185

[56] References Cited

U.S. PATENT DOCUMENTS

| | | | |
|---|---|---|---|
| 3,627,914 | 12/1971 | Davies | 358/185 |
| 3,793,480 | 2/1974 | Waehner | |
| 3,946,275 | 3/1976 | Marino | 315/383 |
| 4,018,986 | 4/1977 | Wilk | 358/142 |
| 4,203,131 | 5/1980 | Harwood et al. | 358/34 |
| 4,205,344 | 5/1980 | Rayner | 358/185 |
| 4,223,352 | 9/1980 | Belisomi | 358/185 |
| 4,321,625 | 3/1982 | Smith | 358/185 |
| 4,340,903 | 7/1982 | Tamura | 358/185 |

Primary Examiner—Richard Murray
Attorney, Agent, or Firm—Richard S. Sciascia; Harvey A. David

[57] ABSTRACT

A multiple channel cathode ray tube video display provides for adjusting the brightness of the displayed channel by a single input control, such a trackball or keyboard, to a computer that generates a channel coded binary word that is held in one of a plurality of memory latches, each corresponding to a channel. The binary word is converted to an analog brightness signal that controls the gain of a corresponding one of a plurality of video signal amplifiers.

4 Claims, 1 Drawing Figure

U.S. Patent  Jul. 19, 1983  4,394,689
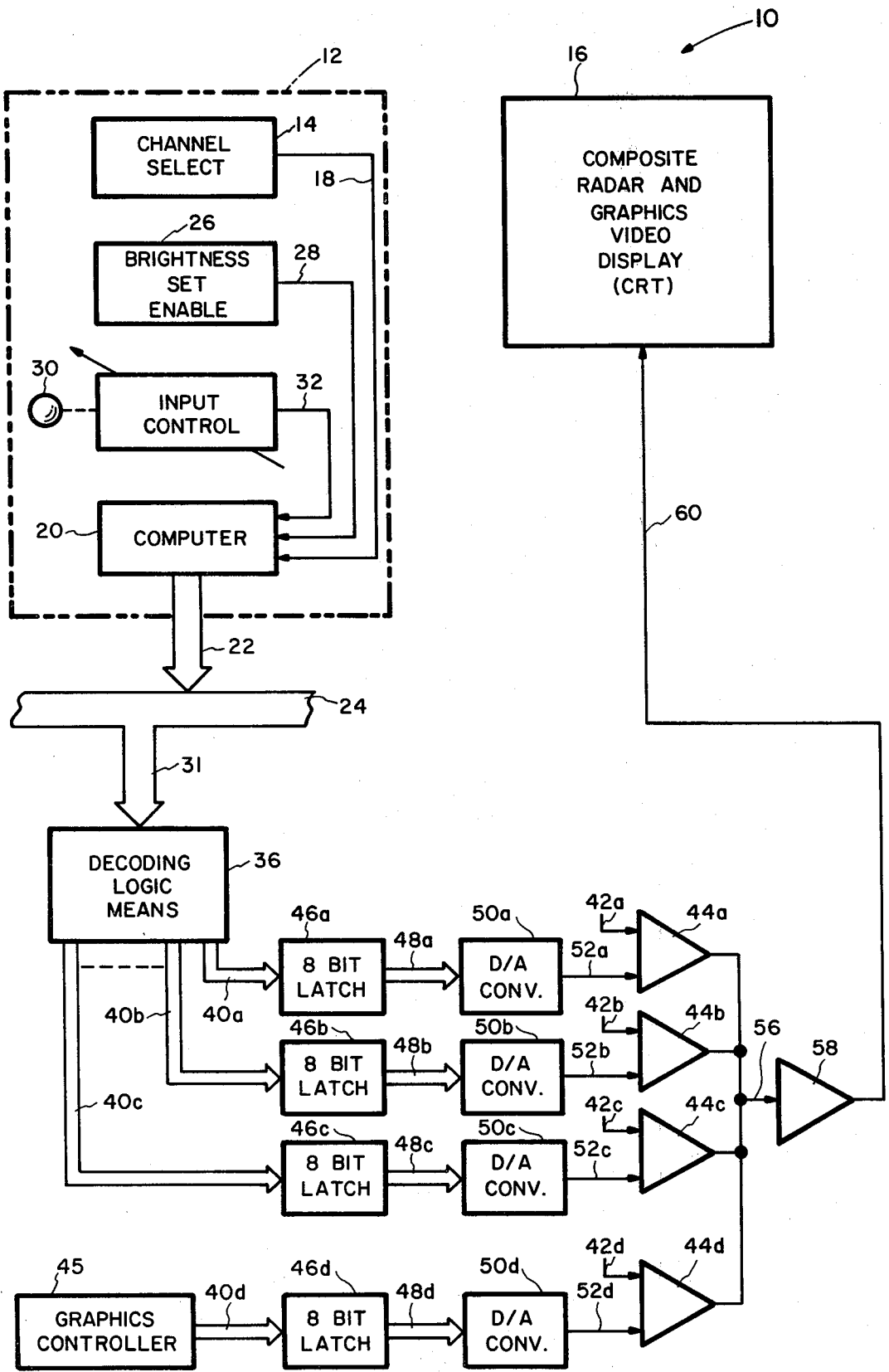

PROGRAMMABLE CRT BRIGHTNESS CONTROL

BACKGROUND OF THE INVENTION

This invention relates to multiple channel video display apparatus, and more particularly to a programmable system for providing appropriate brightness levels to each of a plurality of channels available for selective display on a CRT (cathode ray tube).

The invention finds application where an operator can control or call up a display from any one of a plurality of video channels or signals. For example, where a multiplicity of radar or computer generated images, e.g., range marks, map video, radar video, test video, synthetic targets, etc., are avaiable for viewing individually on a CRT. Such arrangements are known for aircraft approach, manufacturing plant process control, and the like. Heretofore, such systems have incorporated individual panel mounted manual gain or brightness controls for each channel in the form of selector switches and potentiometers for controlling the brightness of each type of video. These systems have required an inordinately large amount of panel space for individual mechanical control switches and/or potentiometers, and have diverted the operator's time and attention from the principal task. Moreover, the mechanical switches and/or potentiometers have low reliability, resulting in short mean time between failures and excessive down time.

SUMMARY OF THE INVENTION

With the foregoing in mind, it is a principal object of this invention to provide, in a multiple channel video display system using a common CRT for selective channel display, and a common control for setting the brightness of the video display for each channel.

Another object is to provide a programmable brightness control for use with multiple channel or image signal CRT display systems having a micro or mini computer that can be responsive to operation of the common control, e.g., a keyboard or trackball, to provide a binary word representative of the desired brightness level for each channel, and contemplates, for each video channel, a plural bit memory latch together with a D/A (digital to analog) converter to control the video gain of the respective video channel in accordance with the binary word value.

A concomitant and important object is the reduction of manual, panel mounted controls necessary for manipulation by the operator, thereby reducing likelihood of error from diversion of operator attention, and also reducing chances of component failure.

Still another object is the provision of a programmable brightness control system of the foregoing character which is inexpensive, reliable, and substantially entirely of solid state construction.

Other objects and many of the attendant advantages will be readily appreciated as the subject invention becomes better understood by reference to the following detailed description, when considered in conjunction with the accompanying drawing.

DESCRIPTION OF THE DRAWING

The sole FIGURE is a diagrammatic illustration, in block form, of a programmable CRT brightness control system embodying the invention as applied to a multiple radar video channel and graphics display system, for example of a type used for air traffic control.

DESCRIPTION OF THE PREFERRED EMBODIMENT

Referring now to the FIGURE, a multiple channel display system is indicated generally at 10. For purposes of describing the invention, consider the system 10 to be part of an aircraft ground control radar system that comprises an operator control panel 12 including a mode or channel selecting control 14, which may be in the form of a switch, keyboard, or the like, and which is utilized by the operator to call up for display any one of a plurality of video channels on a composite radar and graphics display 16 of the CRT type. In this example, the channel selecting control 14 is connected, as shown by line 18, to a computer 20, forming part of the system 10 and adapted to provide binary digital outputs 22 to a computer bus 24 for a variety of purposes including the brightness control of this invention.

The panel 12 also comprises a brightness set enabling control 26, connected as shown by line 28 to the computer 20. This control may be in the form of a switch or, when available, may be effected by operation of a keyboard. Lastly, for the purposes of illustrating this invention, the panel 12 comprises a manually operated brightness selecting control, which in this embodiment conveniently comprises a slider or trackball 30 although, again, a keyboard or other manipulative control may be used. Positioning of the trackball provides a variable output signal, corresponding to the trackball position and represented by line 32, to the computer 20.

Connected to computer bus 24 is a decoding logic means 36 that has a plurality of alternative, brightness representing binary word outputs 40a, 40b, 40c corresponding to a like plurality of alternative radar video channels for which the brightness is to be controlled. In this example, there are three such radar video channels 1,2, and 3 the video signals of which are represented by lines 42a, 42b, and 42c feeding controllable gain amplifiers 44a, 44b, and 44c, respectively. An additional video channel is shown for displaying computer generated graphics and includes a graphics controller module 45 that has a brightness representing binary word output 40d. The graphics video signal is represented by line 42d feeding a controllable gain amplifier 44d.

The binary word outputs 40a, 40b, 40c, and 40d, which in this example are 8 bit words, are applied as inputs to a plurality of 8 bit memory latches 46a, 46b, 46c, and 46d, respectively. These latches are conveniently commercial dual in-line packaged solid state devices. The outputs 48a, 48b, 48c, and 48d of these latches are applied to D/A digital to analog converters 50a, 50b, 50c, and 50d, respectively, for conversion to D.C. voltage signals 52a, 52b, 52c, and 52d representative of selected brightness for the respective video channels. These voltage signals are applied as the gain control inputs to amplifiers 44a, 44b, 44c, and 44d, the outputs of which are connected in common to the input 56 of a final amplifier 58. The output 60 of amplifier 58 is applied as the video brightness control voltage to the CRT video display 16.

In operation, the operator enters, by actuation of channel select control 14 and enabling control 26, a radar channel the display brightness of which is to be adjusted, say channel 2 for example. He then moves the trackball 30 up to increase brightness or down to decrease it. As the computer 20 detects and responds to changes in the trackball setting it generates corresponding changes in the channel coded, brightness determining binary word output to the bus 24, and which is directed by the decoding logic means to the appropriate one of the latches, 46b in this instance. Each word change is stored in the latch 46b and also appears at the latch output to the digital to analog converter 50b so that the gain control voltage 52b to amplifier 54b changes appropriately and effects corresponding changes in the brightness control voltage 60 and in the brightness of the display.

If the enable control 26 is deactivated with the trackball at a particular location providing a selected level of brightness, the work then prevailing in the latch 46b is held thereby and that brightness level maintained without being affected by movement of the trackball 30 for performing other functions. In this example there are 256 8 bit word permutations permitting a fine degree of brightness level control from zero to maximum.

At this point it should be noted that the computer 20 can readily be provided with an algorithm for conversion of the trackball position to the binary word output that will result in proportional brightness control, logarithmic control, or some other desired relation between trackball position and brightness.

Control of the brightness of the graphics video is independently effected similarly to the radar channels, but with the graphics controller module 45 providing binary word input 40d to the latch 46d.

In the event a computer accessing keyboard is provided and to be used instead of a trackball for brightness level input, the brightness is selected by entering a value for 0 to 255 (for this particular case) via the keyboard.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A system including means for selectively displaying any one of a plurality of video channels on a cathode ray tube display means, said system being characterized by the improvement comprising:
    a manually actuable brightness set enable means for providing an enable signal while actuated;
    a manually operable control means for providing a selectively variable brightness input signal;
    computer means, responsive to coincidence of said enable signal and said brightness input signal for providing a digital word output representative of the currently displayed channel and a display brightness level corresponding to said input signal;
    decoding means, responsive to said digital word output to provide a plurality of separate digital words each representative of a selected brightness level for one of said channels;
    a plurality of digital storage and readout means each corresponding to one of said channels and operative to store the digital words for that channel upon deactivation of said enable signal, and to read out said digital word whenever the corresponding channel is being displayed;
    means for converting each digital word to a brightness level control signal when the corresponding channel is displayed;
    said display means being responsive to said brightness level control signal whereby a predetermined brightness level of the display means is effected for each channel upon its display.

2. A display system as defined in claim 1, and wherein:
    said single input means comprises an element movable along a linear path.

3. A display system as defined in claim 2, and wherein:
    said computer is programmed to provide a non-linear correspondence between operation of said single input means and the selected display brightness for the channel selected for display.

4. A brightness adjusting apparatus for a multiple video channel system for displaying video signals from a selected channel, said apparatus comprising:
    first input means for selecting the video signal channel for which the brightness is to be adjusted;
    second input means for selecting the brightness of a selected channel display;
    computer means, responsive to said first and second input means for generating a plural bit binary word representative of the selected brightness for the selected channel;
    a plurality of plural bit binary memory latches, each corresponding to one of said channels;
    means for directing said binary word to the latch corresponding to said selected channel;
    a plurality of digital to analog converters, each responsive to a binary word in a corresponding one of said latches and operative to provide an analog signal representative of a selected brightness;
    a plurality of controllable gain amplifiers, each responsive to one of said video signals and having its gain responsive to one of said analog brightness signals to provide a video signal output the amplitude of which corresponds to the selected brightness for that channel; and
    final amplifier means for coupling the selected channel video signal output to said cathode ray tube display means.

* * * * *